United States Patent
Anglin et al.

(10) Patent No.: US 6,267,365 B1
(45) Date of Patent: Jul. 31, 2001

(54) TRUSS JIGGING/PRESSING SYSTEMS (75) Inventors: Maurice William Anglin, Park Orchards; Ian Currie, Ferntree Gully; Alan Kearon, Dandenong South; John Fredrick Wardell, Glen Waverley; Gavin Cox, North Caulfield; Graham Barry Ash, Kew, all of (AU)

(73) Assignee: Ajax Technology Centre Pty Ltd., Melbourne (AU)

( * ) Notice: Subject to any disclaimer, the term of this patent is extended or adjusted under 35 U.S.C. 154(b) by 0 days.

(21) Appl. No.: 09/448,369

(22) Filed: Nov. 23, 1999

(30) Foreign Application Priority Data

Nov. 23, 1998 (AU) .................................................. PP7237

(51) Int. Cl.$^7$ ..................................................... B25B 1/20
(52) U.S. Cl. ............................ 269/37; 269/910; 269/303; 269/305; 29/281.3
(58) Field of Search .............................. 269/37, 305, 315, 269/304, 303, 910, 254 R; 29/281.1, 281.3

(56) References Cited

U.S. PATENT DOCUMENTS

| | | |
|---|---|---|
| 4,943,038 | 7/1990 | Harnden . |
| 5,085,414 | 2/1992 | Weaver . |
| 5,553,375 | 9/1996 | Powers . |
| 5,608,970 | * 9/1999 | Owen ...................... 269/37 |
| 5,702,095 | 12/1997 | Williams . |
| 5,941,514 | * 8/1999 | Burcaw .................... 269/37 |
| 5,947,460 | * 9/1999 | Williams ................. 269/37 |
| 6,042,096 | * 3/2000 | MacLean ................. 269/37 |

* cited by examiner

Primary Examiner—Timothy V. Eley
Assistant Examiner—Lee Wilson
(74) Attorney, Agent, or Firm—Wolf, Greenfield & Sacks, P.C.

(57) ABSTRACT

A locator stop (10) having a body (12) is arranged to be supported on an upper surface of a truss table formed with a plurality of panels (P), so as to extend across a slot (S) between successive panels. The body (12) has a basal surface (22) by which it is supportable on the upper surface of the table. The stop has a lock (14) which projects below the body (12) so as to be at least partly locatable in the slot (S). The lock (14) has dimensions in two mutually perpendicular directions, substantially parallel to the basal surface (22), which respectively are less than the width of the slot (S) and greater than the width of the slot. The lock (14) is adjustable by a manual operation performed above the table, wherein the lock (14) is able to firmly engage at least one of the panels (P) defining the slot (S) and thereby clamp or hold the body (12) on the upper surface at a required position along the slot.

17 Claims, 10 Drawing Sheets

TRUSS JIGGING/PRESSING SYSTEMS

FIELD OF THE INVENTION

This invention relates to improvements in jigging and pressing systems for the production of timber trusses, such as roof trusses. The invention relates more particularly to locator stops (also known as pucks) for use with a truss table for these systems, and to a truss table having such stops or pucks.

BACKGROUND OF THE INVENTION

Truss tables for truss jigging and pressing systems are well known. Examples are disclosed in U.S. Pat. Nos. 4,943,038 (to Hamden), 5,085,414 (to Weaver), 5,702,095 (to Williams) and 5,553,375 (to Powers). In general, each of these references discloses an elongate truss table including a longitudinal series of table sections in which successive sections are separated by a respective transverse slot. Each table section includes a longitudinal series of transversely disposed relatively narrow panels with successive panels also separated by a respective transverse slot. Some slots, typically those between table sections, have a respective conveyor device able to be raised from a lower, retracted position to a position in which it is operable to move a substantially completed truss laterally off the table. Other slots house either fixed nuts or movable carriers to each of which a respective locator stop or puck is able to be secured on the top surface of the table, by means of a bolt. The stops are able to be secured in an array over the table surface, as required to enable them to accurately position lengths of timber which are to be secured in assembly to form a timber truss of a required configuration in which the timber lengths comprise chords and webs. The timber lengths are at least partially secured at junctions therebetween by toothed truss plates or nail plates which have been pressed to force teeth of each plate into each of the timber lengths forming a respective joint.

The truss or nail plates usually are partially pressed by a relatively light, travelling pressure roller which is passed over the truss table or by a platen press. The resultant partially completed truss then is moved off the table and pressing is completed by a heavier finishing roller. This double pressing procedure is used because the arrangement for securing the locator stops or pucks necessitates use of relatively wide slots between panels of the truss table. The width of the slots is such that if pressure sufficient to complete pressing on the table were to be used, the nail plates would not press satisfactorily or they would be deformed.

In addition to these constraints on pressing, the locator stops or pucks are such that considerable time is expended in securing them in required positions. Usually, each is secured by an Allen bolt tightened relative to a nut or carrier. This needs to be done carefully for each stop in turn to ensure that none of the stops is able to be inadvertently displaced during jigging and pressing.

SUMMARY OF THE INVENTION

The present invention is directed to providing an improved form of locator stop (or puck), and a truss table having such stops or pucks. At least in preferred forms, the stop of the invention enables at least some disadvantages of the known stops to be overcome or alleviated.

A locator stop or puck according to the invention has a body which is adapted to be supported on the upper surface of a truss table, so as to extend across a slot between successive panels of the table. The stop also has locking means which projects below the body so as to be locatable in the slot. The body has a basal surface by which it is supportable on the upper surface of the table, while the locking means has dimensions in two mutually perpendicular directions substantially parallel to the basal surface which respectively are less than the width of the slot and greater than the width of the slot. The locking means is adjustable, by a manual operation performed above the table, whereby the locking means is able to firmly engage at least one of the panels defining the slot and thereby clamp or hold the body on the upper surface, at a required position along the slot.

The body may define an external peripheral surface against which a timber length for a truss bears in use of the stop. The peripheral surface preferably is substantially cylindrical such that the timber length extends tangentially with respect to the peripheral surface. However if required the peripheral surface can be other than cylindrical.

In a first arrangement according to the invention, in which the body defines an outer peripheral surface contactable by a timber length for the truss, the body defines a central bore. The locking means is mounted at the lower end of a stem located in the bore of the body. A transverse pin through the upper end of the stem is journaled in an eccentric, while the eccentric bears on a surface of the body and is rotatable to raise or lower the stem. The locking means, which is raised and lowered with the stem, has a resiliently compressible element carried on a rigid backing member secured to the stem. The arrangement is such that with the eccentric rotated to raise the stem and hence the locking portion, the resilient element is compressed and thereby resiliently engages at least one panel defining the slot and clamps the body on the upper surface of the table.

In a first form of that first arrangement, the locking means is of L-shape, with the backing member thus defining an arm or ledge which extends laterally from the lower end of the stem and on which a resilient element is provided. In use, the ledge extends below one of the panels defining a slot of the table and, as the eccentric is rotated to raise the stem, the resilient element is compressed against the one panel. In a variant of that first form, the locking means is of inverted T-shape, to define two arms or ledges on each of which a resilient element is provided, so each element is compressible against a respective panel. In a second form, the resilient element is located along an upper edge of the backing member and, in use, is located within the slot so as to be compressed against the body portion so as to bulge laterally outwardly. The resilient element may be compressible against the basal surface of the body portion, or against the lower edge of a fin which is defined by the body portion and extends below the basal surface.

In the first form, compression of the resilient element generates a bias acting against lifting of the stem, with this bias causing the body portion to be clamped by being pulled down against the upper surface of the table. In the second form, compression of the resilient element causes it to be squeezed or deformed outwardly so as to bear firmly against, and be held between, respective edges of panels between which the slot is defined.

Rather than define an external peripheral surface against which a timber length for the truss is able to bear, the body in a second arrangement according to the invention is in the form of a hub or top plate. In that case the locator stop preferably includes a housing in which the body is located, and the housing preferably is rotatable relative to the body to actuate the locking means. The housing defines such external peripheral surface, and its peripheral surface preferably is cylindrical.

In a first form of the second arrangement, the housing is in screw threaded engagement with the body. The arrangement is such that, as the housing is rotated in a direction to cause it to advance downwardly onto the body, the housing bears against and moves a force transferring member and thereby generates a force acting to urge the locking means into locking or gripping engagement with at least one of the panels defining the slot. In one embodiment, the force transferring member and the locking means comprise respective arms of a bell-crank lever, in that the arms are at a suitable angle such as generally at right angles and have a common fulcrum at their junction. The fulcrum enables the arms to pivot in unison on an axis which is substantially parallel, and adjacent, to the basal surface of the body. The arrangement preferably is such that, as the force transferring member is moved by the housing, the locking means is urged into locking engagement with a panel defining the slot.

The above-mentioned bell-crank lever preferably has its arms at an angle slightly in excess of a right angle, such as from about 95 to 105°. Thus, as the housing is rotated to bear against and move the force transmitting member, the latter is pivoted so as to be moved towards a position in which it is parallel with the basal surface of the body. Accordingly, the locking means is pivoted, away from a position in which it is substantially perpendicular to the basal surface, to a position in which it forcefully bears against and thereby achieves locking engagement with a panel defining a slot of the table. Preferably the body defines a recess which opens at the basal surface, with the force transmitting member being located in the recess.

In a second form of the second arrangement, the housing is mounted on the body so as to be rotatable thereon. An upper portion of the locking means projects through the body and is engaged with the housing in a manner enabling rotation of the housing relative to the locking means. At least one of the housing and body defines an arcuate ramp surface along which an opposed surface of the other of the housing and body rides as the housing is rotated. The ramp surface and the opposed surface are such that, as the housing is rotated, they cause the housing to move upwardly or downwardly relative to the body, depending on the direction of rotation. The locking means is caused to move in unison with the housing, and thereby to lock with at least one panel defining a slot when in a raised position. The locking means has a resiliently compressible element carried on a rigid backing member, with locking achieved by the resilient element being compressed and thereby resiliently engaging the at least one panel. The resilient element and backing member preferably is of a form and operates as described above, with reference to the first or second form of the first arrangement according to the invention.

The ramp surface and the opposed surface each may comprise a respective one of threadably engaged, complementary helical screw threads. However, in one alterative, the ramp surface comprises an upwardly facing, part helical surface of an arcuate ramp which projects upwardly from the body towards the housing. In another alternative, it comprises a downwardly facing, part helical surface of an arcuate ramp which projects downwardly from the housing towards the body. The opposing surface can take a variety of forms in those alternatives, but it preferably is a ramp surface of complementary form to the ramp surface with which the opposing surface co-operates.

In a third arrangement, the locking means is provided at the lower end of a stem which is located in a central bore defined by the body. An upper end of the stem is threaded and is threadably engaged by a threaded member, which may be at least partly accommodated with an enlarged and circular section of the bore relative to a lower section of the bore through which the remaining section of the stem extends. The threaded member preferably is a snug fit within the enlarged bore section, but remains rotatable relative to the body. The locking means comprises a member that can be raised or lowered to forcefully bears against and thereby achieves locking engagement with a panel defining a slot of the table preferably against a basal surface of one or both of a pair of facing panels that define the slot. This movement occurs as a result of rotation of the threaded member relative to the stem and the body. The member of the locking means preferably includes a resilient element and backing member secured to the free end of the stem for resiliently engaging the or each panel, in the manner already described.

In a fourth arrangement, the locking means is again located at the lower end of a stem located in a bore extending through the body. An upper end of the stem is threaded and is threadably engaged by a threaded member, which may be at least partly accommodated with an enlarged and circular section of the bore relative to a lower section of the bore through which the remaining section of the stem extends. The threaded member preferably is a snug fit within the enlarged bore section.

In this fourth arrangement, the locking means is formed by a tapered section of the stem, preferably a tapered end section. The taper can either result in the stem extending from a minor cross-sectional thickness at a position spaced from the free end of the stem, to a major cross-sectional thickness at, or adjacent to the free end, or the stem can taper in opposite cross-section. The tapered section of the stem is arranged for locking engagement with a leg section of the body, which leg section extends into the slot and has a taper of opposite configuration to the stem. The arrangement is such that relative movement between the stem and the leg by rotation of the threaded member to raise or lower the stem within the slot, is such as to cause the respective tapered sections of the stem and the leg to ride over each other and in one direction to expand widthwise across the slot to take up the width of the slot, and in the opposite direction to contract widthwise, thereby respectively locking or releasing the locking means. Movement of the tapered sections into locking engagement causes either or both of the stem and the leg to engage at least one of the panels defining the slot and thus to lock the locator stop or puck in position relative to the truss table. Movement of the tapered sections out of locking engagement, releases the stem and/or the leg from engagement with at least one of the panels to permit movement or removal of the stop. The release required is that which at least permits movement of the locator stop relative to the table, and therefore complete disengagement of the or each of the stem and the leg from engagement with the panel or panels, is not necessarily required. That is, continued engagement or contact between the stem and/or the leg with one or each of the panels may be permissible in the unlocked condition of the locator stop, as long as that engagement or contact still permits movement or removal of the locator stop.

In a preferred form, of the fourth arrangement, a locked condition is achieved by rotation of the threaded member to raise the stem relative to the leg.

Both the leg and stem of the fourth arrangement have a width in the lengthwise direction of the slot greater than the width of the slot in the direction transverse to the lengthwise direction of the slot and parallel to the basal surface of the body. By this arrangement, both the body and the stem are restrained against rotation with the threaded member.

A truss table according to the invention includes at least one table section having a longitudinal series of transversely disposed relatively narrow panels, with each pair of successive panels separated by a respective transverse slot. The table preferably has a longitudinal series of table sections with successive sections separated by a respective transverse slot. The at least one table section has at least one respective locator stop or puck according to the invention secured on the table top at each of selected slots of the section; with the locking means of each respective stop or puck being located in and firmly engaged with at least one of the panels defining its slot. The dimensions of the locking means in horizontal section are such that its extent transversely of the table section, i.e. along its slot, is greater than its longitudinal extent i.e. across the width of the slot. This difference in transverse and longitudinal extent preferably is substantial. As a consequence, the slots are able to be narrow without compromising the tensile strength of the locking means and, hence, the force with which the body can be clamped or held on the upper surface of the table section.

With use of narrow slots, the nail plates are able to be pressed more effectively, with substantially reduced risk of the plates being deformed during pressing. Thus, the nail plates are able to be fully pressed by a single pass of a travelling pressure roller. Alternatively, the nail plates can be fully pressed using a platen press arrangement.

The locator stops or pucks are able to be secured in, or released from, engagement in required positions by a simple manual operation which enables the time required for securing or releasing the stops to be reduced substantially relative to bolt arrangements. Thus the time required for setting-up a table for the production of a given truss configuration can be substantially reduced, increasing production throughput and potentially reducing manpower requirements.

It is to be appreciated that, at least in some forms, the locator stop or puck is able to be fitted in relation to, or removed from, a slot from above the table section. That is, it is not necessary with some forms to slide the stop along the slot, from or to one end thereof. This is a feature which is of particular benefit where, for example, movement of a stop along a slot is temporarily obstructed by another stop or a timber length.

BRIEF DESCRIPTION OF THE DRAWINGS

Reference now is directed to the accompanying drawings, in which:

FIGS. 11A and 11B respectively show a top plan view and side elevation of a first component of the stop of FIGS. 9 and 10;

FIGS. 12A to 12C respectively show top and bottom plan views and a side elevation of a second component of the stop of FIGS. 9 and 10;

FIGS. 12A and 13B respectively show a side elevation and a bottom plan view of a third component of the stop of FIGS. 9 and 10;

FIG. 14 shows a top plan view of a fourth component of the stop of FIGS. 9 and 10;

FIGS. 15A to 15C respectively show top and bottom plan views and a sectional view of a fifth component of the stop of FIGS. 9 and 10; and FIG. 16 shows a plan view of a sixth component of the stop of FIGS. 9 and 10.

DETAILED DESCRIPTION

The locator stop or puck 10 shown in FIGS. 1 to 4 comprises a body 12, a locking means 14 and an actuator 16. The body 12 is circular in plan view, and has a cylindrical peripheral surface 18 and flat top surface 20 and surface 22. The body 12 is further characterised by a centrally disposed slot 24 and a recess 26 which extends inwardly from surface 18, and opens at top surface 20 and to slot 24. As shown, slot 24 is of thin rectangular form in plan view and opens at basal surface 22. Also, slot 24 extends through a lower portion of body 12, whereas recess 26 is in an upper portion of body 12. Recess 26 extends part diametrally inwardly from surface 18 in a direction substantially parallel to major sides of slot 24, and across the full upper end of slot 24. Recess 26, along its diametral extent, has a width greater than the spacing between major sides of slot 24, so that the body 12 defines a respective upwardly facing shoulder 28 along the upper extent of each of those sides.

In the same diametral plane as recess 26 extends, body 12 has a pair of fins 30 which depend from basal surface 22. Each fin 30 extends outwardly from a respective minor side of slot 24, but terminates short of surface 18. The fins 30 have a thickness which is equal to or less than the spacing between major sides of slot 24 and, viewed perpendicularly to those sides, each fin 30 is of rectangular form and has a lower edge 30a which is parallel with basal surface 22.

Figures 1, 2, 3, 4:
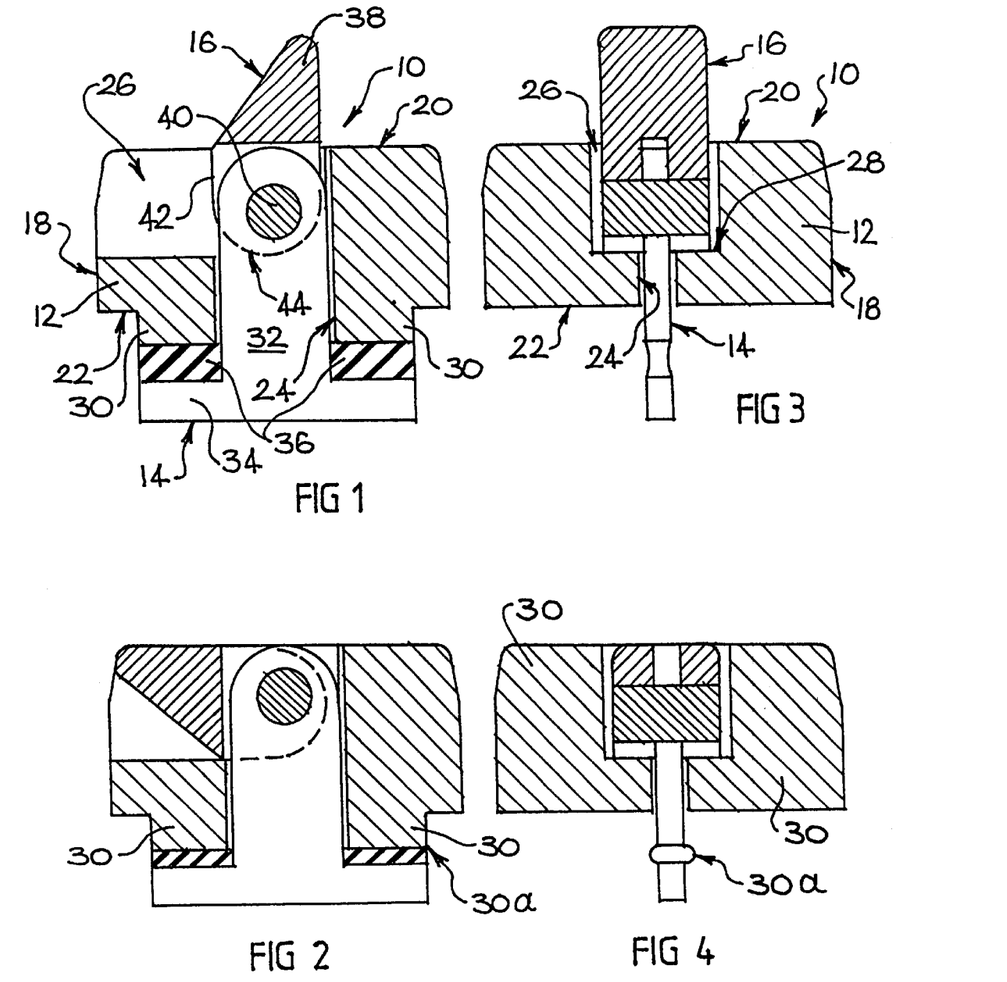
FIGS. 1 and 2 show part sectional, diametral views of a locator stop or puck according to a first embodiment of the invention, respectively in an unlocked and locked condition.
FIGS. 3 and 4 correspond respectively to FIGS. 1 and 2, but are taken on planes at a right angle to that depicted in FIGS. 1 and 2.

The locking means 14, as viewed in FIGS. 1 and 2, has the shape of an inverted "T", to define a stem 32 and, to each side of stem 32, a respective flange 34. The stem 32 has a transverse section similar to, but slightly smaller than, that of slot 24. Stem 32 is received upwardly through slot 24, from surface 22 of body 12, and the upper end of stem 32 is held in recess 26 by engagement with actuator 16. In this arrangement, each flange 34 of locking means 14 is located below a respective fin 30 of body 12. Bonded to the upper surface of each flange 34 and the lower edge 30a of the adjacent fin 30, there is a band 36 of resiliently compressible material. The band 36 may be of a vulcanised rubber or manually inserted rubber, such as one having IRHD value of about 40 to about 60 on the Shore A durometer scale.

Actuator 16 comprises a lever 38 and a pivot pin 40 by which one end of lever 38 is pivotally coupled to the upper end of stem 32 of the locking means 14. As shown, the lower end of lever 38 is bifurcated, with the upper end of stem 32 received between resultant arms 42 of lever 38. Each arm 42 has an arcuate end surface 44 which rides on a respective one of shoulders 28 defined by body 12 in recess 26. The end surfaces 44 are of similar eccentric form with respect to the pivot axis 40a defined by pin 40. The arrangement is such that pin 40 and stem 32 are caused to rise or fall as lever 38 is pivoted between an upright position shown in FIGS. 1 and 3 and a depressed position shown in FIGS. 2 and 4. With lever 38 in its upright position, pin 40 and stem 32 are in a lowermost position, whereas pin 40 and stem 32 are in an uppermost position when lever 38 is in its depressed position. These respectively are release and locking positions.

The resilient bands 36, with actuator 16 in the release position, are substantially uncompressed. As shown in FIG. 3, the thickness of uncompressed bands 36 laterally of flanges 34 is substantially equal to that of stem 32 and the flanges 34. When actuator 16 is moved to its locking position, flanges 34 of course are raised with lifting of stem 32, and each band 36 is compressed between its flange 34 and edge 30a of the respective fin 30 of body 12. This compression of each band 36 causes it to deform so as to decrease in thickness in the direction of compressive forces applied to it, but to increase in unconstrained thickness laterally of flanges 34. By "unconstrained thickness" in this context is meant the thickness bands 36 achieve as a result of compression, assuming there is no external constraint acting to prevent or restrain them deforming laterally.

In use, locator stop 10 is positioned on a truss table section such that body 12 is supported by its basal surface 22 on each of two transverse panels of the table section. With body 12 so supported, fins 30, flanges 34 and bands 36 are located within a slot defined between opposed side surfaces of the panels. The arrangement is such that the width of the slot between those surfaces slightly exceeds the thickness of flanges 34, but is less than the increased unconstrained lateral thickness of bands 36 when actuator 16 is in its locking position. Thus, as lever 38 is pivoted to the locking position, the bands are constrained by and strongly engage the panel side surfaces, with the bands 36 thereby becoming firmly gripped by the panels. As a consequence, locator stop 10 is able to be firmly clamped or held on the table section at a required position along the slot between section panels.

Turning now to FIGS. 5 to 8, the locator stop or puck 110 shown therein includes a body 112, a locking means 114 and an actuator comprising a housing 116. As shown most clearly in FIG. 7C, the body 112 is circular in plan view. It has a mid-height circular plate 50 which defines a basal surface 122 by which the stop 110 is supportable on a truss table section. Such a table section is partially depicted in FIG. 6, in which there is shown two successive lateral panels P of the table section and a slot S defined between opposed side surfaces P' of the panels P.

Figure 5:
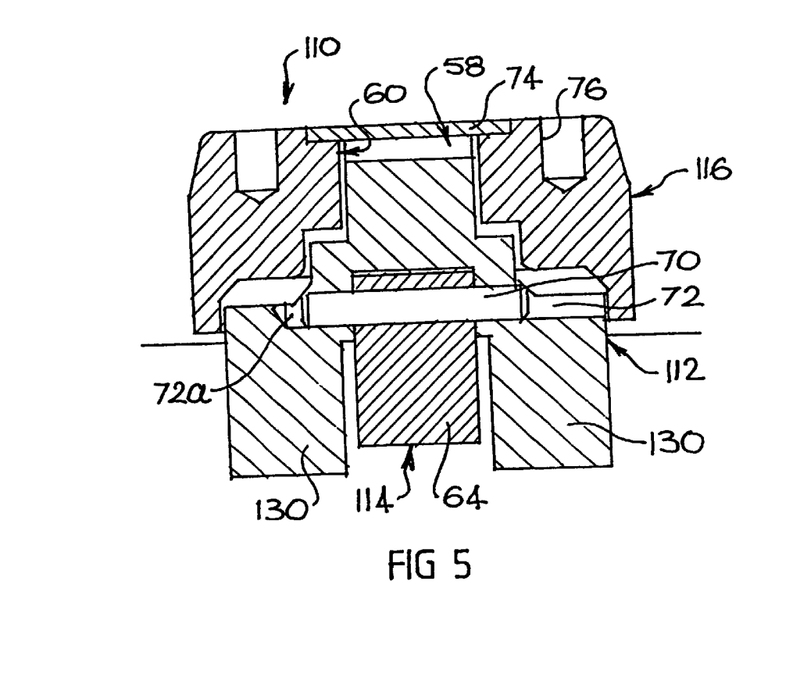
FIGS. 5 and 6 show diametral views of a stop according to a second embodiment and taken, respectively, on planes mutually at right angles to each other.
Figure 6:
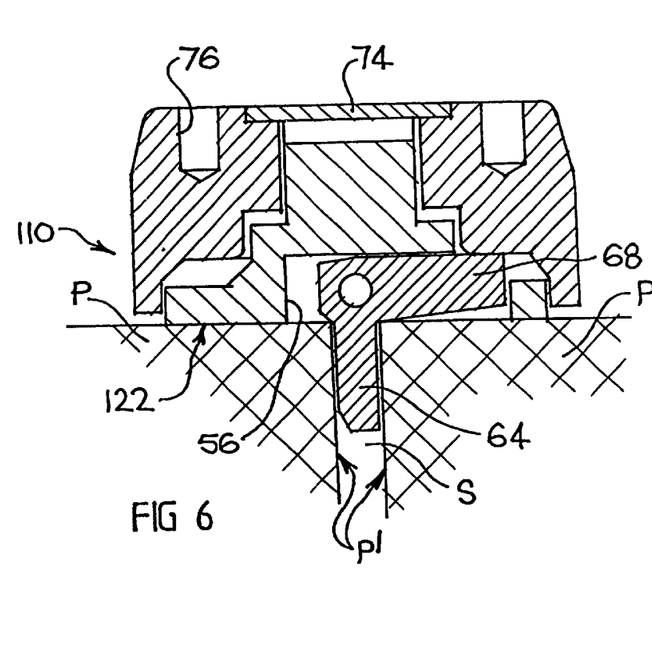
Figure 7A:
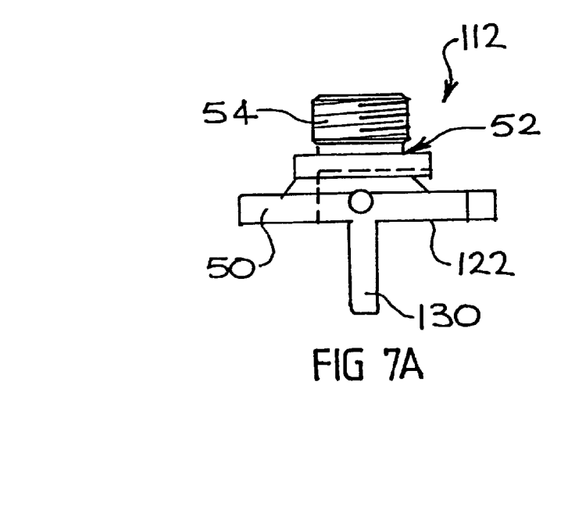
FIGS. 7A to 7C show respective views of a first component of the stop of FIGS. 5 and 6.
Figure 7B:
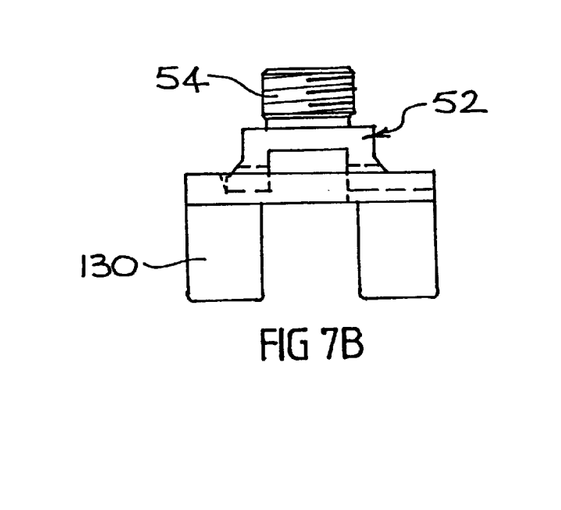
Figure 7C:
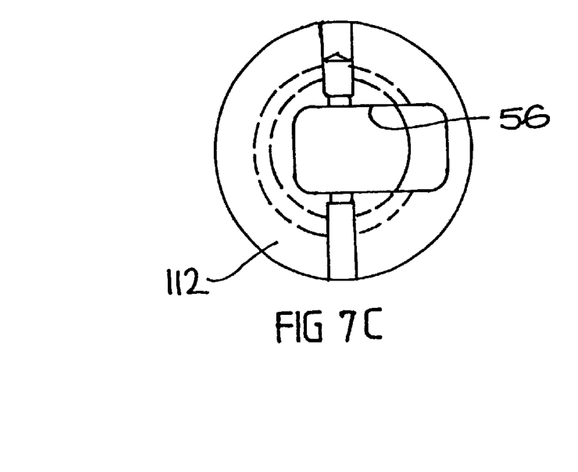
Figure 8A:
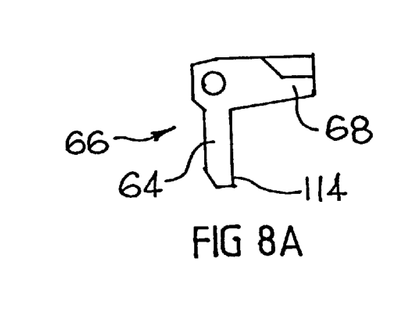
FIGS. 8A to 8C show respective views of a second component of the stop of FIGS. 5 and 6.
Figure 8B:
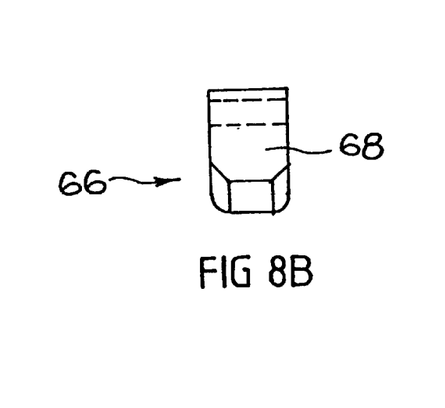
Figure 8C:
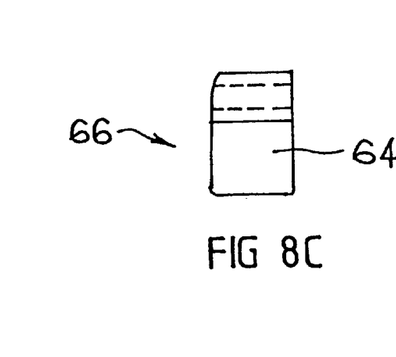

Above its plate 50, the body 112 has an upstanding hub 52, the upper extremity of which is provided with an external thread 54. Below hub 52, the plate 50 has a rectangular opening 56 formed therethrough. The opening 56 is symmetrically disposed with respect to a diametral line parallel with the longer sides of opening 56. However, the opening 56 is offset with respect to the centre of plate 50 such that the longer sides of the opening 56 extend from adjacent the outer edge of plate 50, at one side of the centre, to just beyond the other side of the centre, Depending below its plate 50, the body 112 has two depending fins 130. The fins 130 are in a common diametral plane which is perpendicular to the longer sides of opening 56, with each of those fins extending outwardly from a respective one of those sides to the outer edge of plate 50.

The housing 116 is of annular form, and has a bore 58 of varying cross-section so as to be of substantially complementary form to hub 52. The housing 116 is in screw-threaded engagement with body 112, by an internal thread 60 in an upper is portion of bore 58 being engaged with thread 54 of body 112. Thus housing 116 is able to rotate so as to move axially up or down relative to body 112. In a lower portion of housing 116, bore 58 is stepped to define a downwardly facing annular shoulder 62 which is opposed to the upper surface of plate 50, around hub 52.

The locking means 114 is in the form of one arm 64 of a bell-crank lever 66, with the other arm 68 functioning as a force transmitting member. The arms 64 and 68 have a common fulcrum provided by pivot pin 70. As shown, pin 70 extends across opening 56 of plate 50, with each end of pin 70 received in aligned passages 72, 72a defined by plate 50. The axis of passages 72, 72a and pin 70 are in the diametral plane containing fins 130, such that pin 70 extends across the inner end of opening 56. The arms are mutually inclined at an included angle of about 98°, such that arm 64 depends below basal surface 122 of plate 50, while arm 68 extends along opening 56.

As is evident from FIGS. 5 and 6, each of arms 84 and 68 is of plate-like, rectangular form. Thus, each has a length and width substantially larger than its thickness. Arm 64 has a thickness slightly less than the width of a slot S and, with the locator stop 110 positioned as shown in FIG. 6, arm 64 is within slot S, between and substantially in line with fins 130. With arm 64 in this position, it is substantially perpendicular to basal surface 122 of plate 50. Due to the included angle between arms 64 and 68, the latter therefore then is inclined with respect to the surface 122, such that the outer end of arm 68 is raised. However, this necessitates that housing 116 has been rotated so as to move sufficiently axially upwardly on body 112. When housing 116 then is rotated in the reverse direction, to cause it to move axially downwardly on body 112, shoulder 62 of housing 116 first engages the outer end of arm 68, and thereafter forces arm 68 to pivot downwardly on pin 70. As arm 64 pivots in unison with arm 68, the lower end of arm 64 is caused to swing outwardly to firmly engage one surface P' in slot S. With housing 118 rotated to apply sufficient force to arm 68, locator stop 110 is able to be firmly clamped or held on the table section at a required position along slot S.

As shown, the upper end of bore 58 is covered by a sealing plate 74 which is recessed into the top surface of housing 116. At diametrically opposite sides of plate 74, housing has formed therein at least one pair of holes 76, to enable a suitable tool to be applied for tightening or releasing stop 110, by rotation of housing 116.

Figure 9:
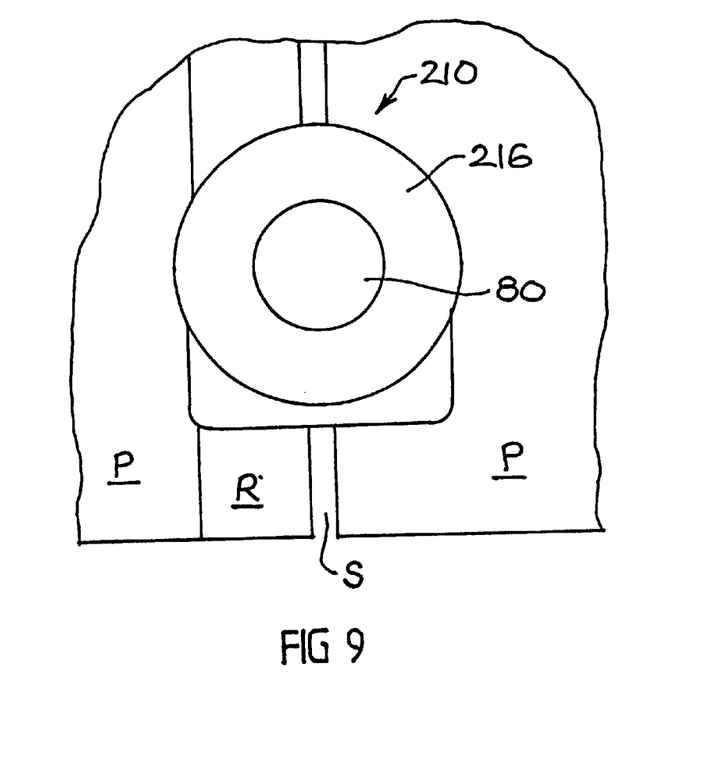
FIGS. 9 and 10 respectively show a plan view and a diametral sectional view of a stop according to a third embodiment, with FIG. 9 showing the stop in relation to part of a truss table section.
Figure 10:
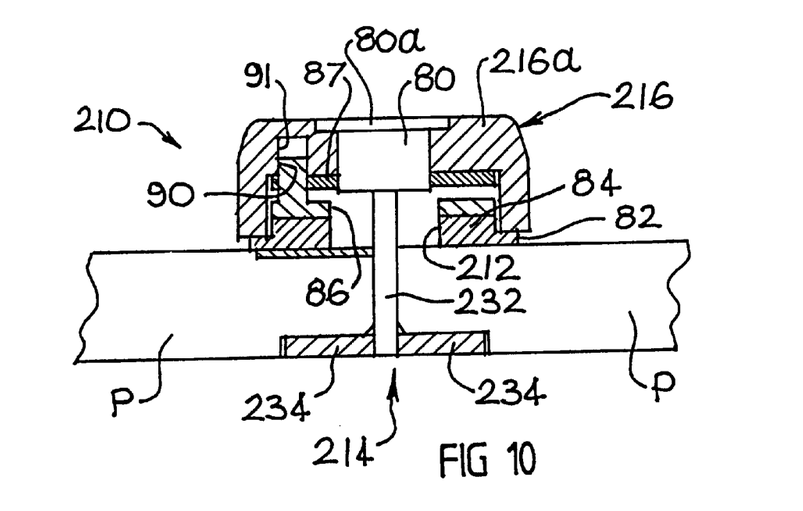

The locator stop or puck 210 of FIGS. 9 and 10 generally will be understood from the drawings and related description in relation to each of stop 10 and stop 110. In the sectional view of FIG. 10, the stop 210 is shown in relation to panels P of a truss table section, with its locking means engaged in the slot S between panels P. Also, there is shown a scale rule R set into the upper surface of one panel P, adjacent to slot S, to enable stop 210 to be accurately positioned as required in the production of a given form of truss. Such a scale rule R can be employed in relation to any of the embodiments described herein.

Figures 11A, 11B, 12A, 12B, 12C, 13A, 13B, 14, 15A, 15B, 15C, 16:
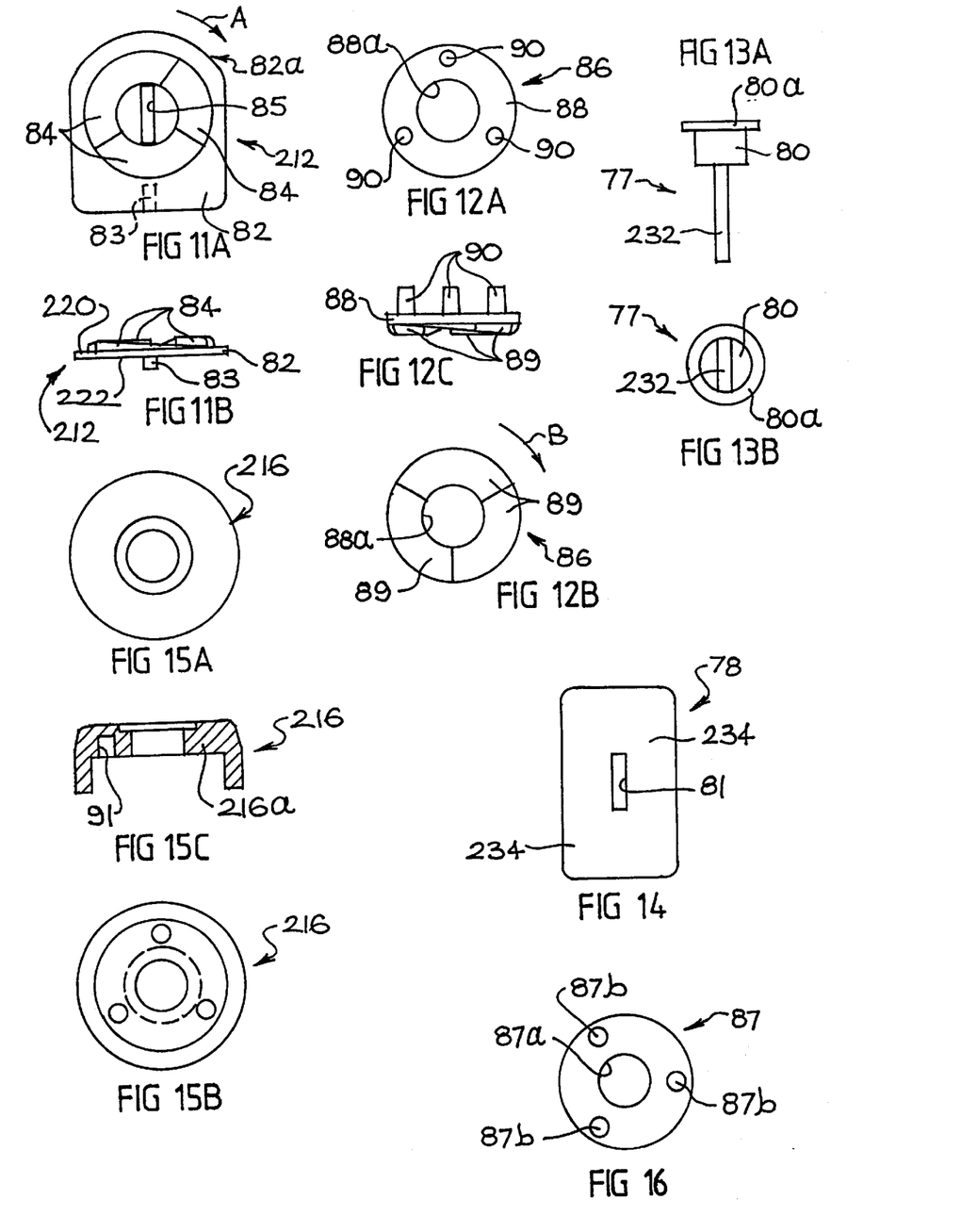

In stop 210, locking means 214 is of inverted T-shape and is defined by a pin 77 (see FIGS. 13A and 13B) and a rectangular bottom plate 78 (see FIG. 14).

The pin 77 has a head 80 and a shank which defines stem 232 of locking means 214. While the head 80 is cylindrical, the stem 232 has the form of an elongate, thin rectangular plate which has a width substantially corresponding to a diameter of head 80 and a thickness which is substantially less than its width. The lower end of stem 232 is secured in an elongate, centrally disposed opening 81 through plate 78, such that plate 78 defines a respective flange 234 of the inverted T-shape, to each side of stem 232. The stem 232 is locatable in slot S, as a neat fit, with each flange 234 extending under a respective panel P and the width dimension of stem 232 parallel to slot S. As will be appreciated, stop 210 is clamped or held in a required position by drawing locking means 214 upwardly so that each flange 234 is caused to bear firmly against the underside of the respective panel P.

Housing 216 is rotatable on body 212 (see FIGS. 11A and 11B), and also is rotatable relative to the cylindrical head 80 which is integral with the upper end of stem 232. A peripheral flange 80a around the upper end of head 80 is recessed into the top surface of housing 216. The arrangement such that as housing 216 moves upwardly or downwardly relative to body 212, stem 232 and flanges 234 move up and down with housing 216.

As shown in FIGS. 11A and 11B, body 212 includes a top plate 82 which defines top and basal surfaces 220 and 222. The plate 82 is of somewhat rectangular form in plan view, but with one end rounded at 82a so as to conform with part of the periphery of housing 216. At its other end, that is, the end remote from end 82a, plate 82 has a tab 83 which depends from basal surface 222. With stop 210 in position relative to slot S, tab 83 locates in slot S and restrains body 212 from rotating with housing 216.

The body 212 further includes an annular array of ramps 84 integral with plate 82. There are three ramps 84 and, as seen in top plan view, each rises in height from surface 220, in the direction of arrow A Within the array of ramps, there is an opening 86 in top plate 82 through which stem 232 is inserted prior to securing the lower end of stem 232 to plate 78. The opening 85 may be of a shape complementary to the transverse cross-section of stem 232, as shown in FIG. 11A, or opening 85 may be of larger form as shown in FIG. 10.

Within housing 216, above body 212, the stop 210 includes an adjustment means 86 (see FIGS. 12A to 12C) and a spacer 87 (see FIG. 16). The means 86 includes an annular plate 88 which overlies the ramps 84 of body 212. As shown, plate 88 defines an opening 88a through which pin 77 extends with opening 88a enabling rotation of plate 88 relative to pin 77. Also, on the underside of plate 88, adjustment means 86 includes an annular array of arcuate ramps 89. There are three ramps 89 and, as seen in inverted plan view (see FIG. 12B), each ramp rises in height from the basal surface of plate 88, in the direction or arrow B. The ramps 89 are complementary in form to, and bear against, ramps 84 of body 212. Thus, as adjustment means 86 is rotated on body 212 in the direction of arrow A, plate 88 of adjustment means 86 is forced upwardly away from top plate 82 due to the ramps 89 riding up around the ramps 84.

Extending upwardly from its plate 88, adjustment means 86 has three guide posts 90 which are spaced at uniform angular intervals. The spacer 87 is of similar annular form to plate 88; defining an opening 87a through which pin 77 extends such that spacer 87 is rotatable relative to pin 77. Also, spacer 87 is provided with a respective opening 87b for each post 90, such that the posts 90 can extend through spacer 87. Above spacer 87, each post extends into a respective bore 91 formed in the underside of top wall 216a of housing 216, while spacer 87 may be bonded to the underside of wall 216a.

The arrangement of stop 210 is such that, with each ramp 89 fully overlaying and bearing against a respective ramp 84, plate 88 is at a minimum spacing from plate 82 of body 212. That spacing is able to be achieved by rotating housing 216 anti-clockwise, that is, in the direction opposite to arrow A, until ramps 89 lock with ramps 84; putting stop 210 in an unlocking condition. With stop 210 in that condition, it is able to be presented to an end of a slot S such that, while stem 232 is able to be received edge-wise along the slot, each flange 234 defined by bottom plate 78 passes below a respective panel P defining each side of the slot S and body 212 and housing 216 pass above those panels and slot S. Housing 216 then is able to be rotated clockwise, in the direction of arrow A, causing adjustment means 86 and spacer 87 to rotate with it, causing each ramp 89 to ride up around the ramps 84.

Rotation of housing 216 in the direction of arrow A, from the unlocking condition, is able to proceed until stop 210 achieves a locking condition. This condition is achieved with rotation of less than 120°, such as from about 60° to 110°, and results from plate 88 of adjustment means 86 reaching a maximum spacing from plate 82 of body 212. That spacing results from the upper surface of plate 88 engaging spacer 87 and thereby being stopped from moving further away from plate 82. Preferably spacer 87 is of a suitable material, such as a polyurethane rubber, which has a balance between stiffness and resilience and provides firm locking of stop 210, while preventing adjustment means 86 from becoming jammed so as to prevent unlocking.

As housing 216 is rotated to adjust stop 210 from its unlocking condition to its locking condition, the increasing separation between plates 88 and 82 causes housing 216 to be lifted relative to body 212. Due to the location of flange 80a of head 80 in the recessed top surface of housing 216, locking means 214 is lifted with housing 216 and thereby causes each flange 234 defined by plate 78 to bear firmly against the lower surface of a respective one of panels P. On stop 216 attaining its locking condition, stop 216 is firmly secured in a required position along slot S by each panel P defining slot S being gripped between a respective flange 234 and surface 222 of body 212.

A further locator stop or puck 310 is shown in FIGS. 17 to 22. Much of the constructional detail of the locator stop 310 will be generally understood from the earlier drawings and related description. In the sectional view of FIG. 17, the stop 210 is, like previous embodiments, shown in relation to panels P of a truss table section, with its locking means engaged in the slot S between panels P.

Figure 22A:
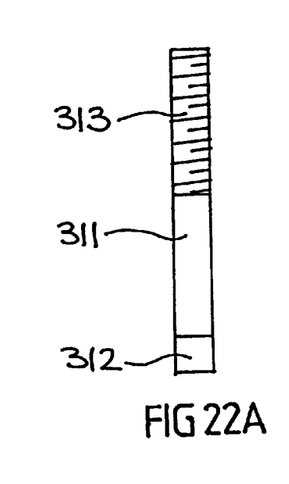
Figure 22B:
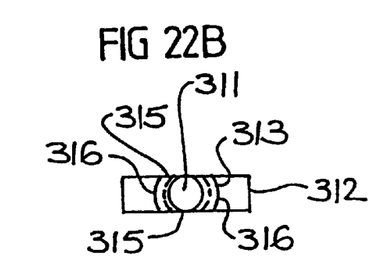
Figure 22C:
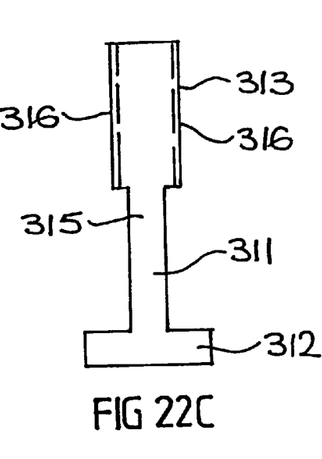

In stop 310, locking means 314 is of inverted T-shape and is defined by a stem 311 (see FIG. 22c) and a flange 312. An upper portion of the stem 311 is threaded at 313 for threaded engagement with a head 314. As shown in FIG. 22b the stem 311, including the threaded section 313, is machined to have planar sides 315 extending between rounded and threaded ends 316. The resultant shape of the stem 311 is such as to fit snugly within the opening 317 of the stop housing 318. Receipt of the stem 311 within the opening 317 is such as to provide for simultaneous movement of the stem 311, and thus the flange 312, with rotary movement of the housing 318.

Figure 17:
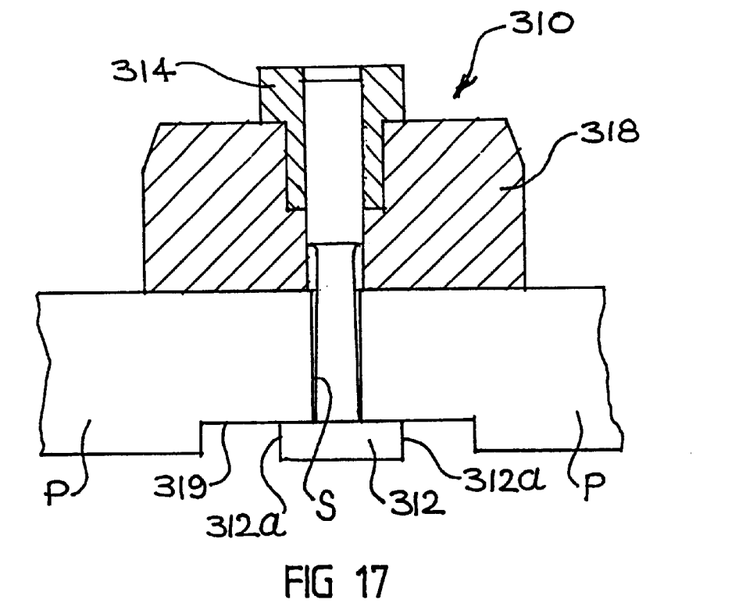
FIGS. 17 to 22 show views of a third embodiment according to the invention.
Figure 18:
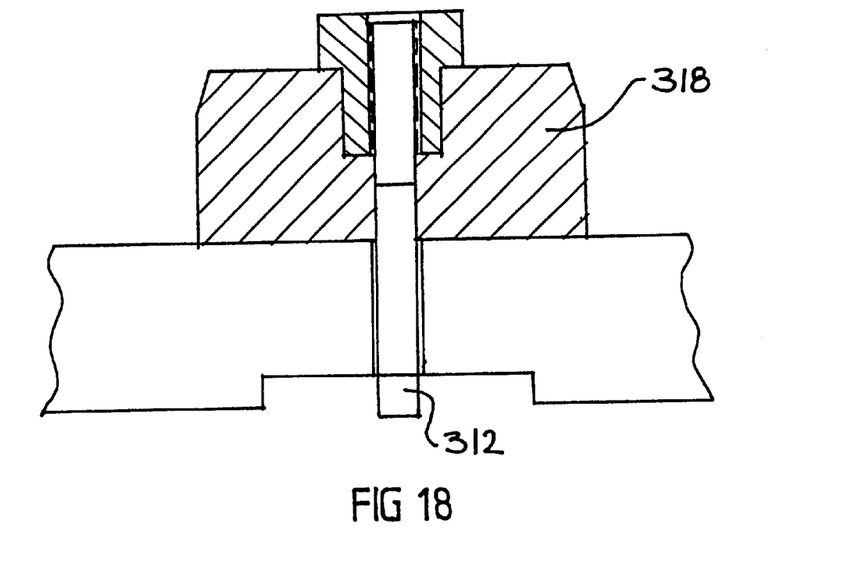

In the above manner, the flange 312 can be moved from a locked condition as shown in FIG. 17, to an unlocked condition, as shown in FIG. 18 for removal of the puck from the truss table. In this respect, the stop 310 has an installation position shown in FIG. 18, in which the flange 312 has a lengthwise orientation parallel to the lengthwise extend of the slot 5. In this position the stem 211 and the flange 312 can be received through the slot 5 for operation. This is a particularly advantageous situation, because installation of the stop from above the truss table is not readily available in the earlier embodiments, in particular, the embodiment of FIGS. 9 and 10. In that embodiment, the puck must be inserted into the slot from an end of the table and this can be inconvenient, particularly if timber trusses need to be shifted to permit the puck to be slid into position along a slot.

In the FIG. 18 position, the stem 311 and thus the flange 312 can be rotated to the operative position shown in FIG. 17 by rotating the housing 318. The housing, by its cooperation with the stem 311 through the opening 317, constrains the stem 311 to be rotated therewith. The housing is rotated to the position shown in FIG. 17, so that the flange 312 extends across the slot S with no vertical displacement of the flange 312 relative to the basal surface of the recess 319. The recess 319 can have a width transverse to the slot S which is greater than the length of the flange 312 shown in FIG. 17, or the slot width can be slightly less than the flange length. In the first form, as shown in FIG. 17, the flange 312 can be aligned at about 90° to the installation position shown in FIG. 18. However, to correctly align the flange 312, markings on the body 318 and on the upper surface of one or each of the panels P should be provided, to assist with correct alignment. In the second form, the ends of the flange will engage the walls 319a when the housing is rotated and that will indicate correct positioning of the flange for locking of the puck. In this form, the flange 312 will be at approximately 70° (not 90°) to the lengthwise extent of the slot S.

With the flange rotated to the FIG. 17 position, the head 314 is operable as described hereinafter to raise the flange toward the base surface of the recess 319 and to thereby forcibly engage that surface to secure the stop 310 in position relative to the panels P.

Figure 19A:
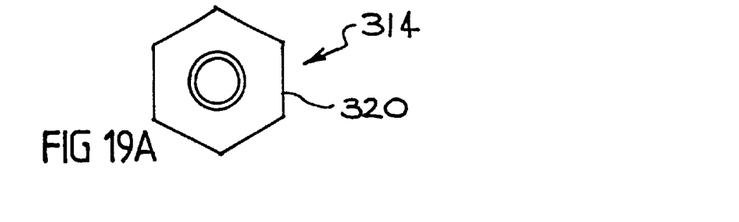
Figure 19B:
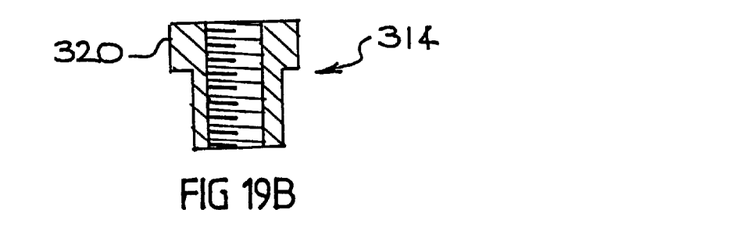

In order to lock the stop 310 in position, the head 314 is rotated, to raise the flange 312 toward or away from a recess 319 formed between the facing truss panels P. As shown in FIG. 19a the head 314 has an hexagonal outer periphery 320 for engagement by a suitable tool. Thus, strong engagement between the flange 312 and the recess 319 can be achieved, to securely lock the stop 310 in a desired position.

Release of the stop 310 is achieved by rotating the head 314 in a manner to lower the flange 312 away from the basal surface of the recess 19. This permits movement of the stop lengthwise along the slot S. The stop 310 can be removed from the slot S, by rotating the housing 318 to rotate the flange 312 to the position shown in FIG. 18. In that position, the flange 312 can be removed through the slot S and the stop removed from the truss table.

Figure 20A:
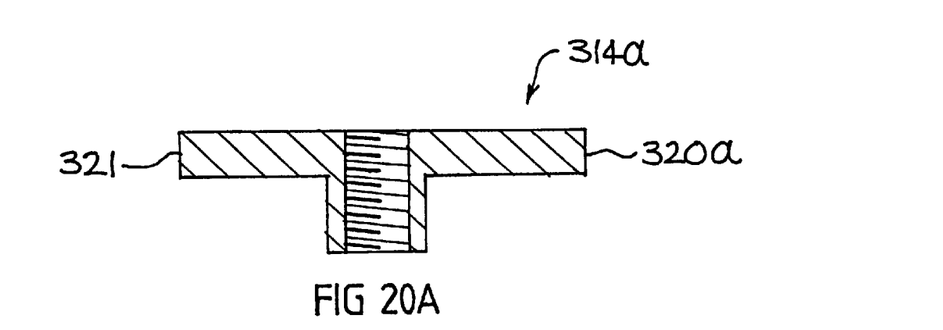
Figure 20B:
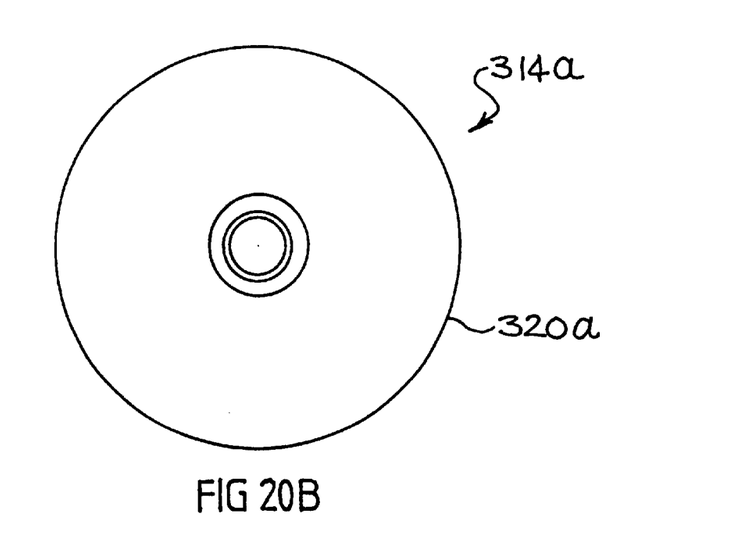
Figure 21A:
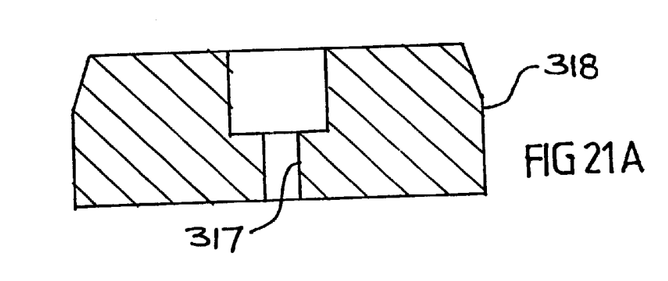
Figure 21B:
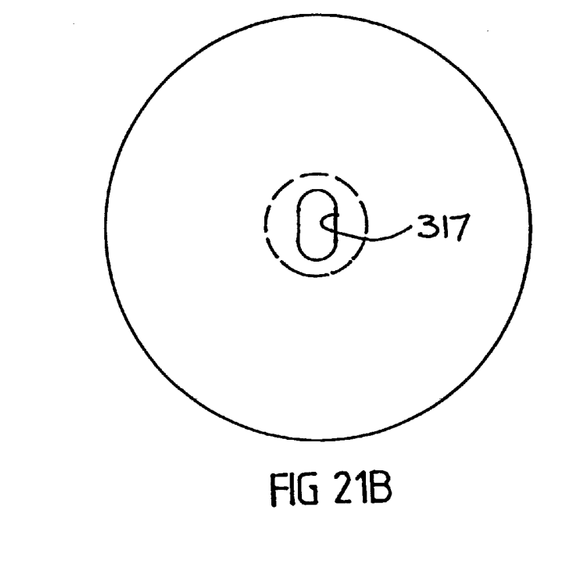

FIGS. 20a and 20b shown an alternative construction of the head 314. The head 314a shown in Figures in 20a and 20b includes a circular head periphery 320a and the peripheral face 321 may be knurled or toothed or otherwise configured for gripping by a suitable tool. Otherwise, the head 314a operates in substantially the same manner as the head 314.

A further form of locator stop or puck 410 is shown in FIGS. 23 to 27 and again, the operation of the stop 410 will be understood generally in relation to the earlier drawings and related description. In the sectional view of FIG. 23, the stop 410 is shown in relation to panels P of a truss table section with its locking means engaged in the slot S between panels P.

In stop 410 the locking means includes a member 411 which includes a head 412 and a stem 413. The head 412 is shown in plan view in FIG. 25a and from that figure, it can be seen that the head is circular and includes a thread 414. The stem 413 depending from the head 412 is of generally rectangular cross section of a thickness to be received within the slot S. The stem has a length in the longitudinal plane of the slot S, which is substantially greater of the width slot S.

The head 412 of the member 411, is arranged to be threadably engaged by a threaded cap 415, so that rotation of the cap 415 relative to the head 412 permits raising or lowering of the stem 413 within the slot S.

Figures 26A, 26B:
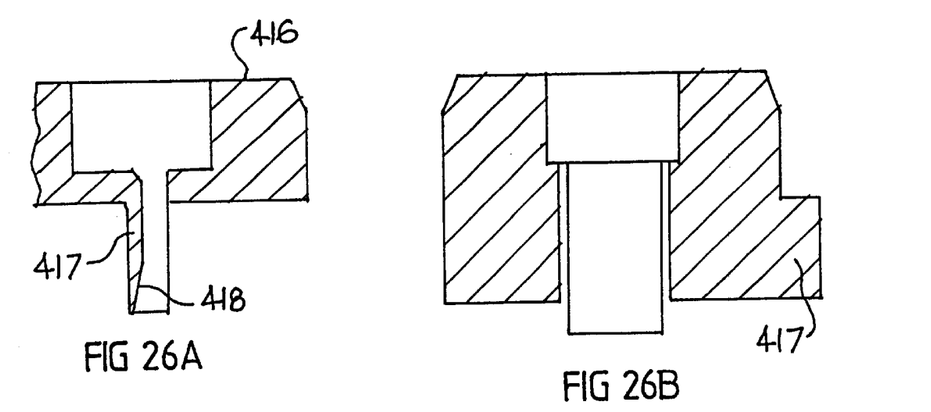

The stop 410 includes a housing 416 which includes a leg 417 which extends into the slot S. The leg 417 is shown in FIG. 26a and from this figure, the distal end of the leg 417 is shown to have a tapered form 418. The leg 417 extends for the major length of the housing 416 parallel to the lengthwise plane of the slot S as shown in FIG. 26b. Thus, when the stop 410 is assembled on the panels P, the leg 417 locates the stop 410 against rotation, by receipt within the slot S.

Figure 23:
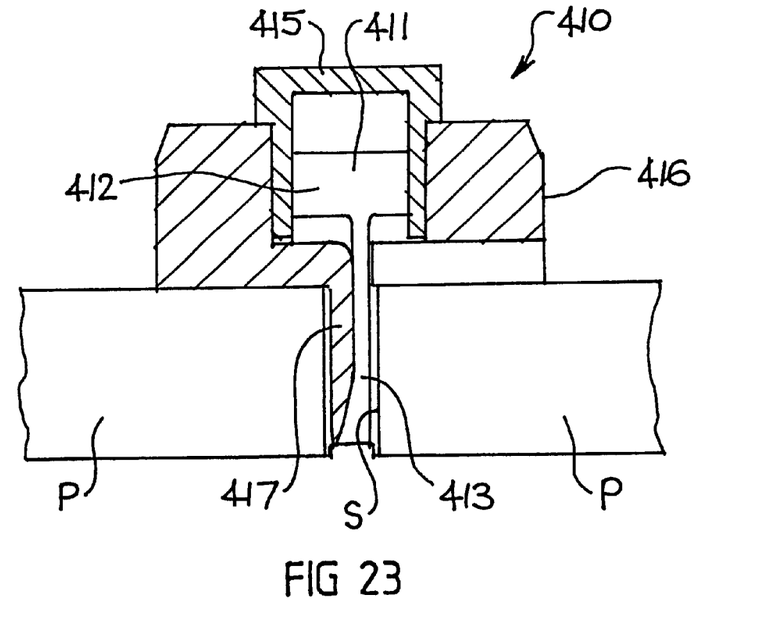
FIGS. 23 to 27 show views of a fourth embodiment according to the invention.
Figure 24:
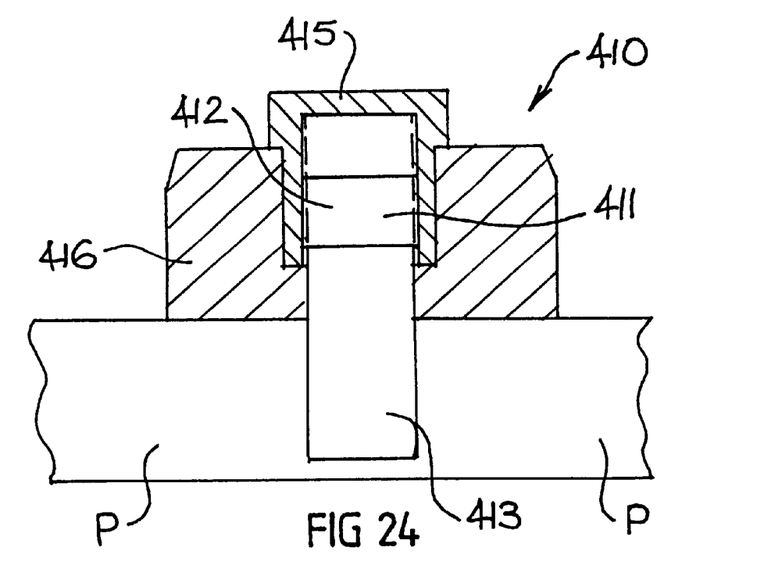
Figure 25A:
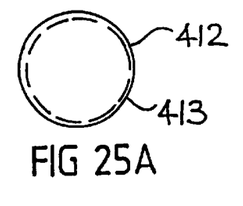
Figure 25B:
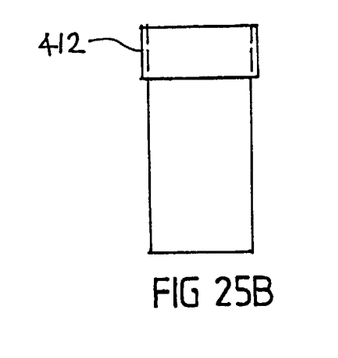
Figure 25C:
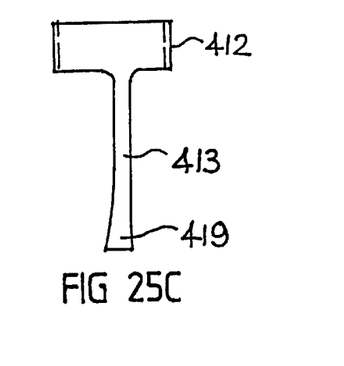

With reference to FIGS. 23 and 25c, the stem 413 includes a tapered distal end 419 which is tapered in the opposite manner to the taper 418 of the leg 417. The relative tapers are complementary, so that the tapered faces nest together in the locked condition of the stop 410.

Operation of the stop 410 is by rotation of the cap 415 relative to the housing 416 and the head 412 of the member 411. Rotation of the cap 415 in a first direction is operable to raise the member 411 so as to engage the tapered faces of the stem 413 and the leg 417 and to force those parts into engagement with one or both of opposed sides of the slot S. By that engagement, the locator 410 can be securely located relative to the panels P.

In a second and opposite direction of rotation of the cap 415, the member 411 is lowered so as to disengage the stem 413 and the leg 417 from the opposed sides of the slot S and so enable the stop 410 to be moved relative to the panels P or removed from engagement therewith entirely.

Figure 27A:
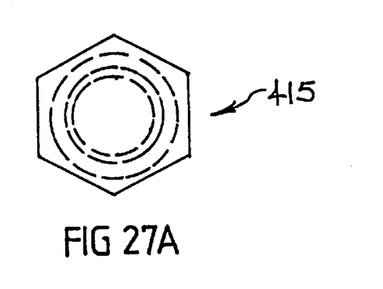
Figure 27B:
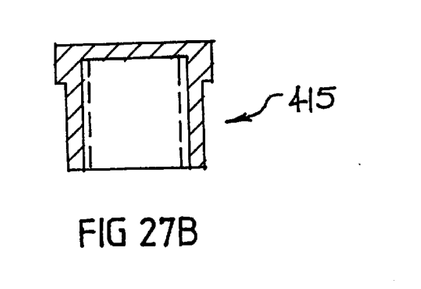

Plan and side views of the cap 415 are shown in FIGS. 27a and 27b and these figures show the cap as having a hexagonal profile for engagement with a suitable tool to rotate the cap relative the housing 416. The cap 415 could alternatively, be constructed in a simular manner to the cap 314a shown in FIGS. 20a and 20b or any other suitable configuration as may be considered appropriate.

Except as herein specified, components of stops 10, 110, 210, 310 and 410 can be made of suitable metals. In the case of stop 210, these metals include cast high tensile bronze for body 212, housing 216 and adjustment means 86, and mild steel for pin 77 and lower plate 78.

Finally, it is to be understood that various alterations, modifications and/or additions may be introduced into the constructions and arrangements of parts previously described (including material properties and treatment) without departing from the spirit or ambit of the invention.

What is claimed is:

1. A locator stop having a body which is arranged to be supported on an upper surface of a truss table formed with a plurality of panels, so as to extend across a slot between successive panels, said body having a basal surface by which it is supportable on the upper surface of said table, said stop having locking means which project below the body so as to be at least partly locatable in said slot, said locking means having dimensions in two mutually perpendicular directions, substantially parallel to the basal surface, which respectively are less than the width of said slot and greater than the width of said slot, said locking means including a locking member mounted at a lower end of a stem located in a bore, a transverse pin extending through an upper end of said stem being journaled in an eccentric, while said eccentric bears on a surface of said body and is rotatable to raise or lower said stem, said locking means being adjustable by a manual operation performed above said table, wherein said locking means is able to firmly engage at least one of said panels defining said slot and thereby clamp said body on said upper surface at a required position along said slot.

2. A locator stop according to claim 1, said locking member including a resiliently compressible element, wherein when said eccentric is rotated to raise said stem, said resilient element is compressed and resiliently engages at least one panel defining said slot and clamps said body on the upper surface of said table.

3. A locator stop according to claim 2, said resilient element being located within said slot and being compressible against the basal surface of said body when said eccentric is rotated to raise said stem, compression of said resilient element causes it to be deformed so as to bear firmly against, and be held between, respective edges of said panels between which said slot is defined.

4. A locator stop according to claim 2, said resilient element being located within said slot and being compressible against a lower edge of a fin which is defined by said body and which extends below said basal surface, when said eccentric is rotated to raise said stem compression of said resilient element causes it to be deformed so as to bear firmly against, and be held between, respective edges of panels between which said slot is defined.

5. A locator stop according to claim 1, said locking means having an L-shape and thereby said locking member defining a ledge that extends laterally from the lower end of said stem and on which a resilient element is provided, said ledge extending below one of said panels defining said slot and upon rotation of said eccentric to raise said stem, said resilient element being compressed against said at least one panel.

6. A locator stop according to claim 1, said locking means having an inverted T-shape so that said locking member defines two laterally extending ledges on each of which a resilient element is provided, said ledges extending below each of said panels defining said slot and upon rotation of said eccentric to raise said stem, each said resilient element is compressed against a respective panel.

7. A locator stop having a body which is arranged to be supported on an upper surface of a truss table formed with a plurality of panels, so as to extend across a slot between successive panels, said body having a basal surface by which it is supportable on the upper surface of said table and defining a central bore, said stop having locking means which project below the body so as to be at least partly locatable in said slot, said locking means having dimensions in two mutually perpendicular directions, substantially parallel to the basal surface, which respectively are less than the width of said slot and greater than the width of said slot, said locking means being provided with a locking member at the lower end of a stem which is located in said bore, an upper end of said stem being threaded and in threaded engagement with a threaded member which is mounted for rotation relative to said body and said stem, said locking member can be raised or lowered to bear and lock against an undersurface of each of said panels defining said slot, the movement of said locking member occurring as a result of relative rotation between said threaded member and said stem, said locking means being adjustable by a manual operation performed above said table, wherein said locking means is able to firmly engage at least one of said panels defining said slot and thereby clamp said body on said upper surface at a required position along said slot.

8. A locator stop according to claim 7, said threaded member being at least partly accommodated within an enlarged circular section of said bore.

9. A locator stop according to claim 7, each said undersurface being recessed inwardly from a basal surface of said panel and from a face of said panel defining said slot, to define a recess to accommodate said locking member.

10. A locator stop according to claim 7, said member being configured to be insertable through said slot and into position for locking against said undersurface, said locking means having an operative position in which said member is rotated to after insertion through said slot to position said member across said slot, and a locking position in which said member is brought into locking engagement with the undersurface of at least one of said panels, movement of said locking means to said operative position occurring by rotation of said threaded member.

11. A locator stop having a body which is arranged to be supported on an upper surface of a truss table formed with a plurality of panels, so as to extend across a slot between successive panels, said body having a basal surface by which it is supportable on the upper surface of said table and defining a central bore and a leg which extends into said slot, said stop having locking means which project below the body so as to be at least partly locatable in said slot, said locking means having dimensions in two mutually perpendicular directions, substantially parallel to the basal surface, which respectively are less than the width of said slot and greater than the width of said slot, said locking means being provided at the lower end of a stem which is located in said bore, an upper end of said stem being threaded and in threaded engagement with a threaded member supported by said body, said locking means being defined by a tapered section of said stem which cooperates with an oppositely tapered section of a leg such that on relative movement between said respective tapered sections, said tapered sections ride over each other so that said stem engages one of said panels defining said slot to lock said locator stop relative to said panels, said locking means being adjustable by a manual operation performed above said table, wherein said locking means is able to firmly engage at least one of said panels defining said slot and thereby clamp said body on said upper surface at a required position along said slot.

12. A locator stop having a body which is arranged to be supported on an upper surface of a truss table formed with a plurality of panels, so as to extend across a slot between successive panels, said body having a basal surface by which it is supportable on the upper surface of said table, and defining a central bore and a leg which extends into said slot, said stop having locking means which project below the body so as to be at least partly locatable in said slot, said locking means having dimensions in two mutually perpendicular directions, substantially parallel to the basal surface, which respectively are less than the width of said slot and greater than the width of said slot, said locking means being provided at the lower end of a stem which is located in said bore, an upper end of said stem being threaded and in threaded engagement with a threaded member supported by said body, said locking means being defined by a tapered section of said stem which cooperates with an oppositely tapered section of a leg such that on relative movement between said respective tapered sections, said tapered sections ride over each other so that said leg engages one of said panels defining said slot to lock said locator stop relative to said panels, said locking means being adjustable by a manual operation performed above said table, wherein said locking means is able to firmly engage at least one of said panels defining said slot and thereby clamp said body on said upper surface at a required position along said slot.

13. A locator stop according to any one of claims 1 or 7, 11, 12, said body defining an external peripheral surface against which a truss bears in use of said stop, said peripheral surface being substantially cylindrical, such that said truss extends tangentially with respect to said peripheral surface.

14. A truss table including at least one table section having a longitudinal series of transversely disposed relatively narrow panels, with each pair of successive panels separated by a respective transverse slot, said at least one table section having at least one locator stop according to any one of claims 1 or 7, 11, 12 secured on the top of said table at each of selected slots of said table section, with locking means of each said respective stop being located in and firmly engaged with at least one of said panels defining a slot.

15. A truss table according to claim 14, said table having a longitudinal series of said table sections, with successive said sections separated by a respective transverse slot.

16. A truss table according to claim 14, the dimensions of said locking means in horizontal section being such that its extent transversely of the table section along a slot is greater than its longitudinal extent across the width of the slot.

17. A locator stop according to claim 11 or 12, said taper of said stem having a major cross-section at a lower end thereof and a minor cross-section toward spaced from said lower end, said leg having an opposite taper and panel engagement occurring by upward movement of said stem relative to said leg.

* * * * *